United States Patent
Geisel

(10) Patent No.: US 9,139,181 B2
(45) Date of Patent: Sep. 22, 2015

(54) PEDAL ARRANGEMENT

(75) Inventor: Andreas Geisel, Bogel (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 592 days.

(21) Appl. No.: 13/073,133

(22) Filed: Mar. 28, 2011

(65) Prior Publication Data

US 2011/0239811 A1    Oct. 6, 2011

(30) Foreign Application Priority Data

Mar. 30, 2010 (DE) .................. 20 2010 004 351 U

(51) Int. Cl.
G05G 1/36        (2008.04)
B60T 11/18       (2006.01)
B60T 7/06        (2006.01)
G05G 1/46        (2008.04)

(52) U.S. Cl.
CPC . *B60T 11/18* (2013.01); *B60T 7/06* (2013.01); *G05G 1/36* (2013.01); *G05G 1/46* (2013.01); *Y10T 74/20528* (2015.01)

(58) Field of Classification Search
USPC .................. 74/478, 512, 513, 560; 60/547.1
IPC .................................. B60T 11/18; G05G 1/46
See application file for complete search history.

(56) References Cited

U.S. PATENT DOCUMENTS

| | | | |
|---|---|---|---|
| 4,697,497 A * | 10/1987 | Leineweber et al. | 91/372 |
| 5,290,120 A * | 3/1994 | Osterfeld et al. | 403/133 |
| 5,934,151 A * | 8/1999 | Carr et al. | 74/512 |
| 6,000,516 A * | 12/1999 | Teichert et al. | 192/85.01 |
| 6,899,016 B2 * | 5/2005 | Gemeinhardt et al. | 92/128 |
| 7,004,664 B2 * | 2/2006 | Gras et al. | 403/133 |
| 2004/0148929 A1 * | 8/2004 | Mita et al. | 60/547.1 |
| 2007/0068321 A1 * | 3/2007 | Song et al. | 74/512 |

FOREIGN PATENT DOCUMENTS

| | | | | |
|---|---|---|---|---|
| CN | 1589375 A | | 3/2005 | |
| CN | 101370695 A | | 2/2009 | |
| CN | 101439674 A | | 5/2009 | |
| DE | 102009032348 A1 * | | 2/2010 | B60T 11/18 |
| EP | 1440858 A1 | | 7/2004 | |
| EP | 1892140 A2 * | | 2/2008 | B60K 23/02 |
| FR | 2611284 A1 | | 8/1988 | |
| FR | 2893291 A1 * | | 5/2007 | B60T 7/06 |
| FR | 2905100 A1 | | 2/2008 | |

OTHER PUBLICATIONS

German Patent Office, German Search Report for German Application No. 202010004351.4, dated Nov. 16, 2010.
Chinese Patent Office, Chinese Office Action for CN 2011100744215, dated Jan. 13, 2014.

* cited by examiner

*Primary Examiner* — Thomas Diaz
(74) *Attorney, Agent, or Firm* — Ingrassi Fisher & Lorenz PC

(57) ABSTRACT

A pedal arrangement is provided for a motor vehicle that includes, but is not limited to a pedal module, on which at least one pedal is movably fastened. The pedal has a mount in which a push rod is movably mounted for the transmission of actuating forces which are exerted onto the pedal. The pedal module has a guide, in which the push rod is guided in a defined position such that an end region of the push rod is able to be positioned in the mount.

8 Claims, 3 Drawing Sheets

PEDAL ARRANGEMENT

CROSS-REFERENCE TO RELATED APPLICATION

This application claims priority to German Patent Application No. 202010004351.4, filed Mar. 30, 2010, which is incorporated herein by reference in its entirety.

TECHNICAL FIELD

The technical field relates to a pedal arrangement for a motor vehicle having a pedal module, on which at least one pedal is movably fastened. The pedal has a mount in which a push rod is movably mounted for the transmitting of actuating forces exerted onto the pedal.

BACKGROUND

Pedal arrangements are known, in which pedals are fastened movably on a pedal module. The concern here is generally with several pedals, such as for instance brake, accelerator and clutch pedal, which are articulated pivotally on the pedal module. By a pivoting movement of the pedals, brought about by pressure, the latter are actuated. In so doing, they transmit the actuating forces, often via push rods, to the corresponding systems, such as for instance the brake system, the fuel supply or the clutch. For a fastening or mounting of the push rod on the corresponding pedal, a mount is provided, in which the end of the push rod which is on the pedal side is positioned.

However, the corresponding systems, to be actuated by push rods, are not situated in the foot space of the vehicle where the pedals are arranged, but rather for example in the engine compartment. On an assembly of the pedal arrangement, the push rods are therefore introduced on the engine compartment side, in particular in mass production, as is usual nowadays, until they are positioned in the mount which is arranged on the corresponding pedal. By the introduction of the push rod on the motor side, a so-called blind installation takes place. This means that the person who is introducing the push rod can not see the mount, which leads to problems in assembly.

A disadvantage here is therefore the great expenditure of effort during assembly, because the exact mounting of the push rod in the mount has to be monitored laboriously. This means a further working step and therefore results in increased costs.

It is therefore at least one object to provide a pedal arrangement for a vehicle, by which an incorrect installation of a push rod can be reduced or prevented entirely. In addition, other objects, desirable features and characteristics will become apparent from the subsequent summary and detailed description, and the appended claims, taken in conjunction with the accompanying drawings and this background.

SUMMARY

Provision is made that the pedal module has a guide in which the push rod is guided in a defined position such that an end region of the push rod is able to be positioned in the mount. In this way, an incorrect installation is practically completely prevented. Even in the case of a blind installation, i.e., with an introduction of the push rod from the side of the pedal module facing away from the pedals, the push rod is able to be introduced through a guide which is adapted to the push rod. The push rod thereby has a defined position; the end of the push rod can thus slide securely into the mount which is arranged on the pedal.

Even a blind assembly of the push rod through an engine compartment can thus be carried out reliably and without the subsequent arrangement of elaborate controlling or monitoring steps. On assembly, a further working step can thus be dispensed with. Assembly on the assembly line thus becomes able to be carried out more quickly and, in addition, at a more favourable cost.

In an embodiment, the guide is arranged in a guide element, which is fastened on the pedal module. Thereby, an easy exchangeability of the guide is made possible, and hence of the position in which the push rod is guided. If the guide element has a cylindrical base body, an end region on the pedal side and an end region on the pedal module side, with the end region on the pedal side being constructed having a spherical portion.

In an embodiment, the guide is constructed as an opening arranged centrally in the end region on the pedal side. In this way, the push rod can be introduced into the guide in a particularly simple manner. Even in the case of an alignment which is not precise, the push rod slides into the opening or respectively guide, whereby the guiding of the push rod in the desired position is made possible in a simple manner.

In an embodiment, the push rod is guided in the guide with play. Thereby, a limited non-axial movement of the push rod is made possible. The pivotal articulation of the pedals, as is widely used, is thus made possible. However, care is to be taken here that the play is kept small, so that the push rod can always slide into the mount.

In an embodiment, the guide element has clip lugs on its end region on the pedal module side, to form a clip connection with undercuts of the pedal module 12. This is a particularly simple fastening, which in addition is embodied so as to be detachable. It is, in addition, advantageous if the guide element has a lug on its end region on the pedal side. This lug serves in particular to relieve the fastening arrangements of the guide element on an introduction of the push rod. Damage to the guide element and an unintentional releasing thereof are thus prevented.

In an embodiment, the mount has a concave mount surface, with the push rod having a convex contact surface, which corresponds in its curvature to the curvature of the convex mount surface. Thereby, a particularly simple and secure pivotal mounting of the push rod in the mount is achieved.

In an embodiment, the pedal is a brake pedal and the push rod is the piston rod of a vacuum brake booster. In particular in brake systems and here in particular in those with vacuum brake boosters, a transmission of the actuating forces by means of a push rod or piston rod is advantageous. Particularly in a safety-relevant system such as a brake system, an incorrect installation must be reliably ruled out. It is particularly advantageous here if the guide element has at least one opening which serves as an air inlet for the vacuum brake booster. It is thereby ensured that a vacuum brake booster is always supplied with sufficient air and operates without problems.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
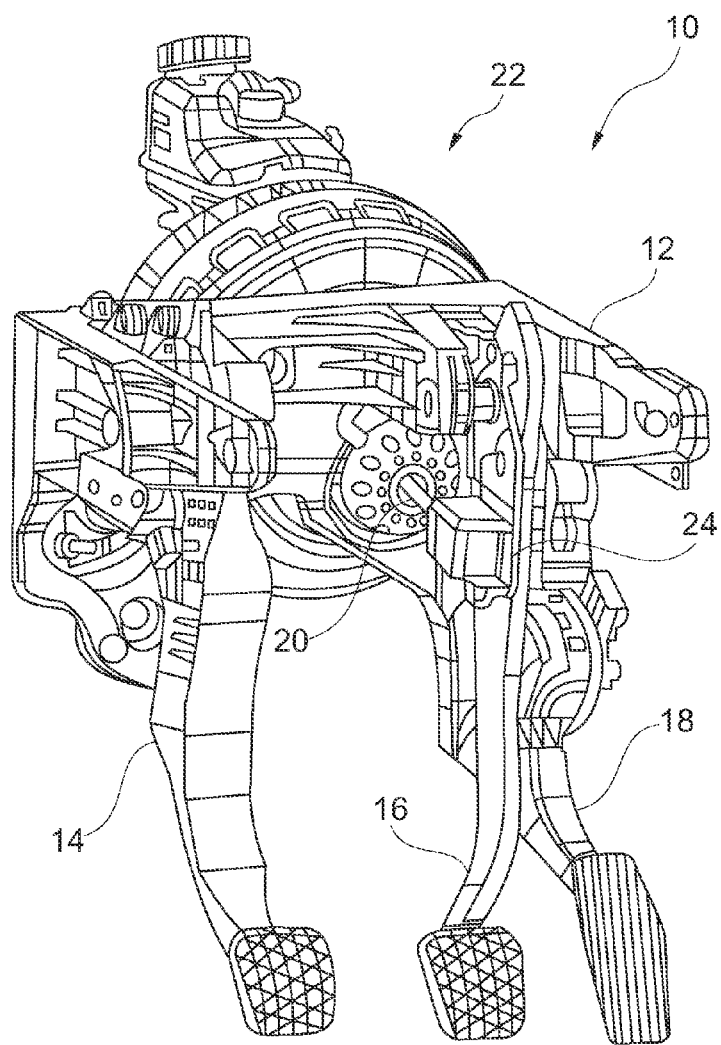
FIG. 1 is a diagrammatic view of a pedal arrangement according to an embodiment obliquely from the front.

In FIG. 1 a pedal arrangement 10 according to an embodiment is shown. The pedal arrangement 10 is the pedal arrangement of a motor vehicle, such as for instance a passenger car, a heavy goods vehicle or a bus. The pedal arrangement 10 is described below in particular with reference to a brake pedal or respectively a brake system. The arrangement can, however, equally relate to an accelerator or clutch pedal.

The pedal arrangement 10 comprises a pedal module 12, on which at least one pedal is movably fastened. In particular, multiple pedals are movably fastened on the pedal module 12. The pedals here can comprise a clutch pedal 14, a brake pedal 16 and an accelerator pedal 18. Expediently, the pedals 14, 16, 18 are pivotally articulated on the pedal module 12. In this way, the driver of the vehicle can pivot the pedals about the pivot axis by a pressure and can thus actuate them.

The actuating pressure that is exerted for example onto the brake pedal 16 must then be transmitted to the brake system. For this, a push rod 20 is provided, which connects the brake system and the brake pedal 16 with each other in a force-fitting manner. In particular, the push rod 20 is the piston rod of a vacuum brake booster.

Figure 2:
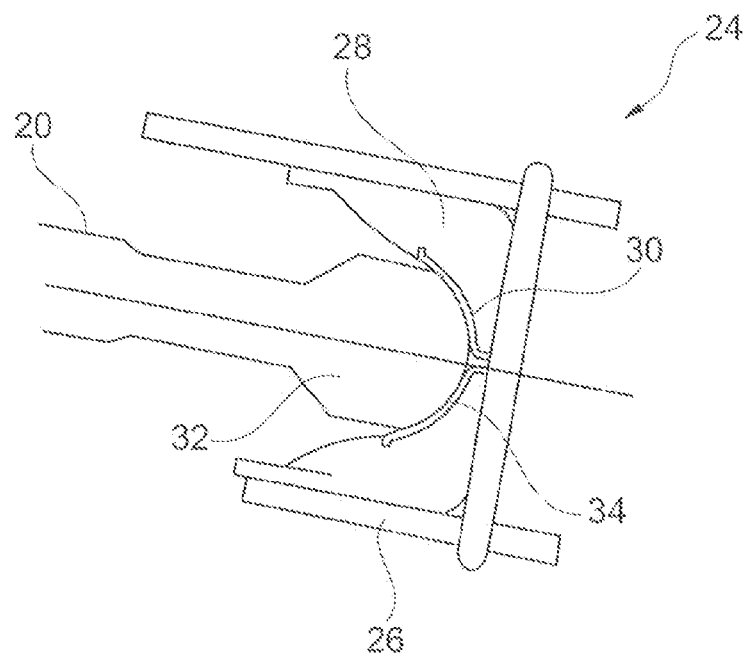
FIG. 2 is the end region of a push rod, positioned in a mount.

In order to ensure a reliable and problem-free transmission of the actuating pressure from the brake pedal 16 via the push rod 20 to the brake system, the brake pedal 16 has a mount 24, which is constructed to receive the push rod 20 and therefore to mount it pivotally on the brake pedal 16, as is shown in detail in FIG. 2.

According to FIG. 2, the mount 24 comprises here a housing 26, which is expediently fastened to the brake pedal 16. Inside the housing 16, a mounting shell 28 is provided to receive the push rod 20. The mounting shell 28 has a mount surface 30, which is concave in shape. In operation, the push rod 20 is arranged or mounted in the mount 24. The push rod 20 has a preferably spherical end region 32. The spherical end region 32 comprises here a convex contact surface 34, which corresponds in its curvature to the curvature of the convex mount surface 30 of the mount 24. Thereby, the contact surface 34 of the push rod 20 lies precisely against the mount surface 30 of the mount 24. In this way, the push rod 20 is reliably mounted in a pivotal manner in the mount 24. A transmission of force precisely on a pivoting of the brake pedal 16 is therefore reliably ensured.

It can be seen that through the semicircular construction of the mounting shell 28 or of the mount surface 30, a slight play is possible on the introduction of the push rod, because the latter automatically slides into its correct position on assembly. However, the dimensions of the housing 26 of the guide element 36 are advantageously kept limited. In the case of an incorrect alignment of the push rod 20, the latter is arranged slightly outside the mount 24 when the pedal arrangement is assembled. Thereby, the push rod has no effect, because its mounting on the brake pedal 16 is no longer guaranteed; a force transmission is therefore impossible.

A reliable and correct mounting of the push rod 20 or respectively of the end region 32 of the push rod 20 in the mount 24 is therefore of great importance. Therefore also on the assembly of such a pedal arrangement it is always to be ensured that the described mounting of the push rod 20 is able to be positioned free of error.

In order to provide a correct installation, a guide 48 is provided in the pedal module 12. The guide 48 can be arranged directly in the pedal module 12. For example, the guide 48 can be formed by an opening in the pedal module 12. However, it is advantageous if the guide 48 is constructed in a guide element 36. It is pointed out here that the advantages described below, and the embodiments of the guide 48 are independent of whether the guide is arranged in a guide element 36 or directly in the pedal module 12.

Figure 3:
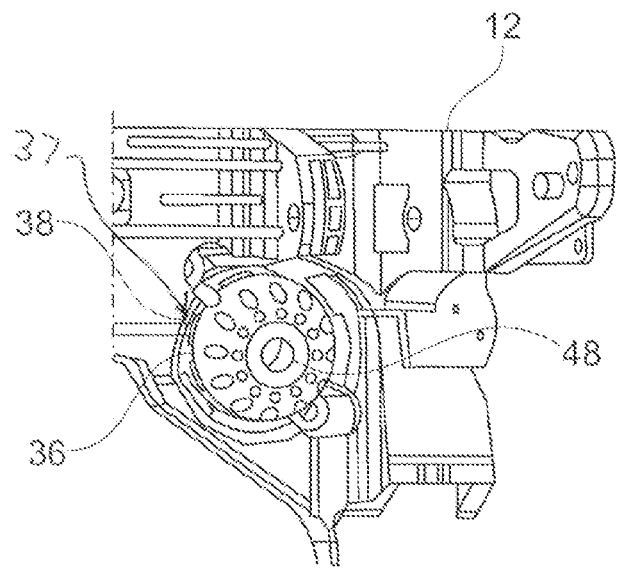
FIG. 3 is a diagrammatic view of a pedal module with a guide element of a pedal arrangement according to an embodiment obliquely from the front.

A pedal module 12 which is equipped with a guide element 36 is shown in FIG. 3. For this, the pedal module 12 has an opening 38, in which the guide element 36 is able to be fastened, as is described later with reference to FIG. 4. The guide 48 serves to keep the push rod 20 exactly in a position defined by the guide 48 on an assembly of the pedal arrangement 10 according to the invention. During all times of the assembly, the end region 32 of the push rod 20 thereby also remains in a precisely defined position. It is thus ensured that on an introduction of the push rod 20, the contact surface 34 slides precisely into the mount surface 30 and is mounted there in an error-free manner. This is even ensured when the push rod 20 is installed in a blind installation, i.e., is introduced from the side of the pedal module 12 facing away from the pedals 14, 16, 18. This is in fact usual in mass production, where a saving on costs is particularly valuable through monitoring steps which have been dispensed with.

Figure 4:
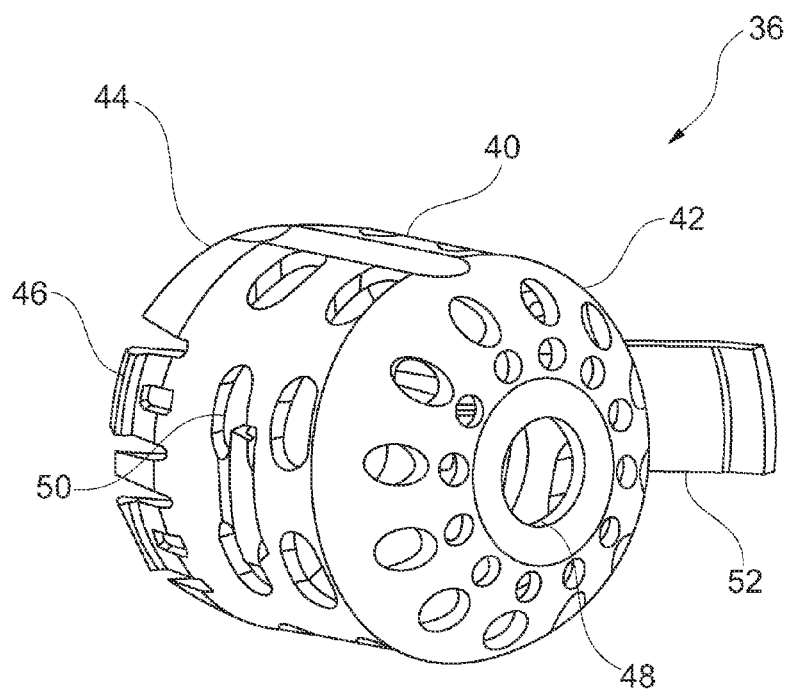
FIG. 4 is a diagrammatic view of a guide element of a pedal arrangement according to an embodiment from the front.

The guide element 36 is shown in detail in FIG. 4. According to FIG. 4, the guide element 36 has a base body 40, an end region 42 defining a spherical portion proximate to the pedal 16 on the pedal side, and an end region 44 opposite the end region 42 and proximate to pedal module 12 on the pedal module side. At the end region 44 on the pedal module side, the guide element 36 is able to be fastened on the pedal module 12. The most varied of possibilities are known to the specialist in the art for fastening the guide element 36 on the pedal module 12. However, a detachable fastening, such as in particular a clip connection, is particularly advantageous. This makes possible a simple form- and force-fitting connection of pedal module 12 and guide element 36.

For the construction of the clip connection, the guide element 36 has a plurality of clip lugs 46, which are arranged on the end region 44 on the pedal module side. The clip lugs 46 engage behind undercuts which are arranged for example as a counter-element adjacent to the opening 38 on the pedal module 12. The clip elements 46 are expediently able to be pressed inwards elastically here, so that they are able to be simply guided past the counter-elements. Such a clip connection is particularly simple to close and to release and has a secure hold here. In addition, such connections are simple to produce and are therefore favourably priced.

In addition, it is made possible in this way that the guide element 36 is only able to be fastened on the pedal module 12 shortly before the introduction of the push rod. The production of the pedal module 12 and of the guide element 36 is therefore able to be carried out independently of each other. This brings about an easy exchangeability of the guide element 36. For example, various systems can thus be connected with a pedal, without altering the pedal module 12 in its construction. Thus, for example, a modification of a pedal module is not necessary when the brake booster is altered. Furthermore, the exchange of the push rod 20 is possible without problems.

A pedal module 12 can therefore be integrated more easily into various vehicle models, without thereby having to relinquish a reliable guidance of the push rod 20 and hence a correct mounting thereof on the pedal.

For guiding the push rod 20, the guide element 36 has the guide 48 on its end region 42 on the pedal side. This guide 48 can be an opening for example, which is arranged centrally in the end region 42 on the pedal side. The diameter of the guide 48 is expediently adapted to the diameter of the push rod 20. Mostly, the push rod 20 is expediently guided here with a certain play in the guide 48. This play is required because the push rod 20 moves not only purely axially upon the force transmission. Rather, a non-axial movement is also possible, because the push rod 20 is moved by a pivotal movement of the brake pedal 16 and is also mounted pivotally thereon.

Through the fact that the push rod 20 is guided by the guide 48 during assembly, it is aligned in a particular position. This alignment corresponds exactly to the position in which it slides exactly into the mount 24 and is mounted there. Any play which may be present on the mounting of the push rod 20 can be balanced out here by the semicircular embodiment of the mount surface 30 and of the contact surface 34, as described above. This is because this embodiment brings it about that even in the case of a slight deviation of the position of the push rod 20, the latter slides exactly into the mount 24 and is mounted reliably there.

In the case where the push rod which is to be guided is one of a brake system, the guide element 36 preferably has one, but particularly preferably a plurality of openings 50. These openings serve to make a free supply of air available to the brake booster, which is important in particular with the use of a vacuum-operated brake booster.

The guide element can additionally have a lug 52, which is arranged on the end region on the pedal side, as can be seen in FIG. 4. This lug can serve to hold the guide element 36 in the case of a fastening in the opening 38 in a correct alignment and in addition relieves the clip lugs 46 on guiding the push rod 20 through the guide 48.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A pedal arrangement for a motor vehicle, comprising:
   a pedal module having a through hole formed therein;
   a pedal movably fastened on the pedal module;
   a mount disposed on the pedal;
   a push rod movably mounted to the mount and configured for transmission of actuating forces exerted onto the pedal; and
   a guide element having a first end region supporting a guide configured to guide an end region of the push rod into the mount, a base body and a second end portion formed opposite the first end portion and releasably secured in the through hole such that the guide element is detachably coupled to the pedal module;
   wherein the first end region comprises a spherical end portion; and
   wherein the guide element has at least one clip lug at the second end region to form a clip connection for detachably coupling the guide element with the pedal module.

2. The pedal arrangement according to claim 1, wherein the guide is an opening arranged centrally in the first end region.

3. The pedal arrangement according to claim 1, wherein the guide is configured to provide play in guiding the push rod.

4. The pedal arrangement according to claim 1, wherein the guide element has a lug at the first end region.

5. The pedal arrangement according to claim 1,
   wherein the mount has a concave mount surface,
   wherein the push rod has a convex contact surface corresponding to a curvature of the concave mount surface.

6. The pedal arrangement according to claim 1,
   wherein the pedal is a brake pedal, and
   wherein the push rod is a vacuum brake booster piston rod.

7. The pedal arrangement according to claim 6, wherein the guide element has a vacuum brake booster air inlet.

8. A pedal arrangement for a motor vehicle, comprising;
   a pedal module having a through hole formed therein;
   a pedal movably fastened to the pedal module;
   a mount disposed on the pedal;
   a push rod movable mounted to the mount and configured for transmission of actuating forces exerted onto the pedal;
   a guide element attached to the pedal module, the guide element comprising a cylindrical base body, a first end region having a spherical portion and a second end region releasably secured in the through hole such that the guide element is detachably coupled to the pedal module; and
   a guide arranged in the guide element, the guide comprising an opening arranged centrally in the first end region and configured to guide an end region of the push rod into the mount;
   wherein the guide element has at least one clip lug at the second end region to form a clip connection for detachably coupling the guide element with the pedal module.

\* \* \* \* \*